United States Patent
King

(10) Patent No.: US 12,246,855 B2
(45) Date of Patent: *Mar. 11, 2025

(54) ON-BOARD PROPULSION TESTING APPARATUS

(71) Applicants: MICHIGAN TECHNOLOGICAL UNIVERSITY, Houghton, MI (US); ORBION SPACE TECHNOLOGY, INC., Allouez, MI (US)

(72) Inventor: Lyon B. King, Houghton, MI (US)

(73) Assignees: MICHIGAN TECHNOLOGICAL UNIVERSITY, Houghton, MI (US); ORBION SPACE TECHNOLOGY, INC., Allouez, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,613

(22) Filed: Dec. 13, 2021

(65) Prior Publication Data

US 2022/0097871 A1 Mar. 31, 2022

Related U.S. Application Data

(63) Continuation of application No. 16/982,230, filed as application No. PCT/US2019/026144 on Apr. 5, 2019, now Pat. No. 11,198,523.

(Continued)

(51) Int. Cl.
*B64G 1/10* (2006.01)
*F01D 17/02* (2006.01)
(Continued)

(52) U.S. Cl.
CPC ............ *B64G 1/1078* (2013.01); *F01D 17/02* (2013.01); *F01D 21/003* (2013.01); *F02K 9/96* (2013.01); *G01M 15/02* (2013.01); *G01M 15/14* (2013.01)

(58) Field of Classification Search
CPC .......... F02K 9/96; G01L 5/133; G01M 15/02; G01M 15/14; B64G 1/1078; B64G 7/00;
(Continued)

(56) References Cited

U.S. PATENT DOCUMENTS 3,112,612 A 12/1963 Adamson et al.
3,572,029 A * 3/1971 Swift, Jr. .................. F02K 9/62
239/265.35

(Continued)

FOREIGN PATENT DOCUMENTS

CN 1343869 A 4/2002
CN 101539482 A 9/2009
(Continued)

OTHER PUBLICATIONS

European Patent Office Examination Report for Application No. 19780743.1 dated Nov. 29, 2022 (7 pages).

(Continued)

*Primary Examiner* — Eric S. McCall
*Assistant Examiner* — Timothy P Graves
(74) *Attorney, Agent, or Firm* — Michael Best & Friedrich LLP

(57) ABSTRACT

An interface assembly for connecting an on-board propulsion system to a testing facility includes a support member configured for coupling to a manipulation system and a mounting member configured for coupling to the on-board propulsion system. A plurality of channels extends between and couples the mounting member to the support member.

13 Claims, 10 Drawing Sheets

Related U.S. Application Data

(60) Provisional application No. 62/653,067, filed on Apr. 5, 2018.

(51) Int. Cl.
  F01D 21/00 (2006.01)
  F02K 9/96 (2006.01)
  G01M 15/02 (2006.01)
  G01M 15/14 (2006.01)

(58) Field of Classification Search
  CPC ........ B64G 1/641; B64G 1/645; B64G 1/646; B64G 1/40; B64G 1/64; F01D 17/02; F01D 21/003; B25J 5/00; B25J 9/06
  USPC ....... 73/865.6, 112.04, 65.05; 244/51, 158.1, 244/173.3, 172.5, 173.1, 137.1, 158.5, 244/159.4, 164, 171.7, 172.2, 172.7; 60/233
  See application file for complete search history.

(56) References Cited

U.S. PATENT DOCUMENTS

| | | | |
|---|---|---|---|
| 3,597,923 | A | 8/1971 | Simon |
| 3,620,394 | A * | 11/1971 | Symons ................... B66C 3/20 |
| | | | 414/733 |
| 3,807,657 | A | 4/1974 | Brill |
| 5,152,169 | A * | 10/1992 | Summerfield .......... G01L 5/133 |
| | | | 73/112.04 |
| 5,763,989 | A | 6/1998 | Kaufman |
| 5,845,880 | A | 12/1998 | Petrosov et al. |
| 5,973,447 | A | 10/1999 | Mahoney et al. |
| 6,032,904 | A | 3/2000 | Hosick et al. |
| 6,619,031 | B1 | 9/2003 | Balepin |
| 6,982,520 | B1 | 1/2006 | de Grys |
| 7,395,656 | B2 | 7/2008 | Rooney |
| 7,624,566 | B1 | 12/2009 | Manzella et al. |
| 9,194,379 | B1 | 11/2015 | Biblarz et al. |
| 10,023,328 | B2 | 7/2018 | Zurbach et al. |
| 11,148,833 | B1 | 10/2021 | Wu et al. |
| 11,198,523 | B2 | 12/2021 | King |
| 2001/0039832 | A1 | 11/2001 | Sondey |
| 2002/0145090 | A1 | 10/2002 | Schenk, Jr. |
| 2002/0145389 | A1 | 10/2002 | Burgova et al. |
| 2005/0230557 | A1 | 10/2005 | Aghili |
| 2005/0237000 | A1 | 10/2005 | Zhurin |
| 2006/0076872 | A1 | 4/2006 | DeGrys |
| 2006/0168936 | A1 | 8/2006 | Rooney |
| 2006/0186837 | A1 | 8/2006 | Hruby et al. |
| 2006/0290287 | A1 | 12/2006 | Kuninaka |
| 2007/0018034 | A1 | 1/2007 | Dickau |
| 2008/0136309 | A1 | 6/2008 | Chu et al. |
| 2008/0314134 | A1 * | 12/2008 | Mainville ............. F01D 21/003 |
| | | | 73/116.03 |
| 2015/0021439 | A1 | 1/2015 | Duchemin et al. |
| 2015/0151855 | A1 | 6/2015 | Richards et al. |
| 2015/0184988 | A1 | 7/2015 | Facciano et al. |
| 2015/0369413 | A1 | 12/2015 | Dill et al. |
| 2016/0001898 | A1 | 1/2016 | Duchemin et al. |
| 2016/0273523 | A1 * | 9/2016 | King ....................... G01L 21/30 |
| 2017/0088293 | A1 | 3/2017 | Zurbach et al. |
| 2017/0191471 | A1 | 7/2017 | Berg et al. |
| 2017/0210493 | A1 | 7/2017 | Marchandise |
| 2020/0102100 | A1 | 4/2020 | Lozano et al. |

FOREIGN PATENT DOCUMENTS

| | | |
|---|---|---|
| CN | 101539485 A | 9/2009 |
| CN | 104847462 A | 8/2015 |
| CN | 105067293 A | 11/2015 |
| CN | 105308447 A | 2/2016 |
| CN | 106662041 A | 5/2017 |
| CN | 106828982 A | 6/2017 |
| CN | 107187618 A | 9/2017 |
| CN | 107352051 A | 11/2017 |
| CN | 108313328 A | 7/2018 |
| CN | 108317061 A | 7/2018 |
| CN | 108367815 A | 8/2018 |
| CN | 110104222 A | 8/2019 |
| CN | 110271693 A | 9/2019 |
| CN | 115720560 A | 2/2023 |
| EP | 1161855 A1 | 12/2001 |
| EP | 3620394 A1 | 3/2020 |
| ES | 2733773 A1 | 12/2019 |
| JP | H0771361 A | 3/1995 |
| JP | 2015182707 A | 10/2015 |
| RU | 2377441 C1 | 12/2009 |
| RU | 2474984 C1 | 2/2013 |
| RU | 2546913 C2 | 4/2015 |
| RU | 2631247 C2 | 9/2017 |
| RU | 2659009 C1 | 6/2018 |
| RU | 2738136 C1 | 12/2020 |
| WO | 02069364 A2 | 9/2002 |
| WO | 2010036291 A2 | 4/2010 |
| WO | 2015031450 A1 | 3/2015 |
| WO | WO2016181360 A1 | 11/2016 |
| WO | WO2020005290 A1 | 1/2020 |

OTHER PUBLICATIONS

Chinese Patent Office Action and Search Report for application 201980024287.2, dated Aug. 24, 2022 (21 pages with translation).
Wu Hanji et al. "Arcjet-Engine Performance Test Using Hydrogen/Nitrogen Mixtures as Propellant." Chinese Space Science and Technology 22.04 pp. 57-63, 2002 (with English abstract on p. 8/8).
International Search Report and Written Opinion for Application No. PCT/US2020/026420 dated Jun. 16, 2020 (16 pages).
International Search Report and Written Opinion for Application No. PCT/US2019/026144 dated Jul. 5, 2019 (12 pages).
International Preliminary Report on Patentability for Application No. PCT/US2019/026144 dated Oct. 15, 2020 (6 pages).
International Search Report and Written Opinion for Application No. PCT/US18/40419 dated Oct. 1, 2018 (11 pages).
International Preliminary Report on Patentability for Application No. PCT/US2018/040419 dated Dec. 29, 2021 (6 pages).
International Search Report and Written Opinion for Application No. PCT/US20/55119 dated Jan. 11, 2021 (15 pages).
International Search Report and Written Opinion for Application No. PCT/US20/55098 dated May 13, 2021 (14 pages).
International Search Report and Written Opinion for Application No. PCT/US20/55063 dated Jul. 1, 2021 (15 pages).
European Patent Office Extended Search Report for Application No. 19780743.1 dated Oct. 15, 2021 (11 pages).
Migliaccio et al., "Vacuum testing of a micropropulsion system based on solid propellant cool gas generators," 61st International Astronautical Congress, Prague, Czech Republic, Sep. 27-Oct. 1, 2010.
European Patent Office Extended Search Report for Application No. 20828644.3 dated Jul. 8, 2022 (8 pages).
Russian Federal Service on Intellectual Property Office Action and Search Report for Application No. 2020136053 dated Mar. 16, 2022 (12 pages including English translation).
Peng et al., Acta Physica Sinica, "On the role of magnetic field intensity on the discharge characteristics of Hall thruster", No. 04, dated Apr. 15, 2024, p. 2535-2542 (16 pages including English machine translation).

* cited by examiner

ON-BOARD PROPULSION TESTING APPARATUS

CROSS-REFERENCE TO RELATED APPLICATION(S)

This application is a continuation of U.S. patent application Ser. No. 16/982,230, filed on Sep. 18, 2020, which is a U.S. national stage entry of International Patent Application No. PCT/US2019/026144, filed on Apr. 5, 2019, which claims priority to U.S. Provisional Patent Application No. 62/653,067, filed on Apr. 5, 2018, the entire contents of each of which are fully incorporated herein by reference.

BACKGROUND

The present disclosure relates to an automated testing apparatus and components associated with a testing facility and simulation chamber for a satellite-based on-board propulsion (OBP) system.

Typically, OBP systems are tested in a ground testing facility to determine performance parameters before being delivered to customers for integration with a satellite. This testing produces a deliverable of test data to prove the OBP system's performance and is generally a labor-intensive and time consuming process.

SUMMARY

The disclosure provides an interface assembly for connecting an on-board propulsion system to a testing facility. The interface assembly includes a support member configured for coupling to a manipulation system and a mounting member configured for coupling to the on-board propulsion system. A plurality of channels extends between and couples the mounting member to the support member.

The disclosure provides, in another aspect, a testing system for testing an on-board propulsion system. The testing system includes a vessel, a vacuum pump in operative communication with the vessel, and a plurality of sensors positioned within the vessel. The testing system further includes a manipulation system, a portion of which is automatically movable toward and away from the vessel. The testing system further includes an interface assembly having a support member configured for coupling to the manipulation system and a mounting member configured for coupling to the on-board propulsion system. A plurality of channels extends between and couples the mounting member to the support member.

The disclosure provides, in yet another aspect, a method for testing an on-board propulsion system within a testing facility. The method includes coupling the on-board propulsion system to an interface assembly and coupling the interface assembly to a manipulation system. The method also includes moving, via the manipulation system, the interface assembly toward a chamber of the testing facility such that at least a portion of the interface assembly is within the chamber. The method further includes connecting the interface assembly to the testing facility such that the interface assembly is configured to receive a fluid from the testing facility. The method additionally includes de-coupling the manipulation system from the interface assembly, operating the on-board propulsion system, and measuring and recording an output thrust force of the on-board propulsion system.

Other aspects of the disclosure will become apparent by consideration of the detailed description and accompanying drawings.

Before any embodiments of the disclosure are explained in detail, it is to be understood that the disclosure is not limited in its application to the details of the formation and arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
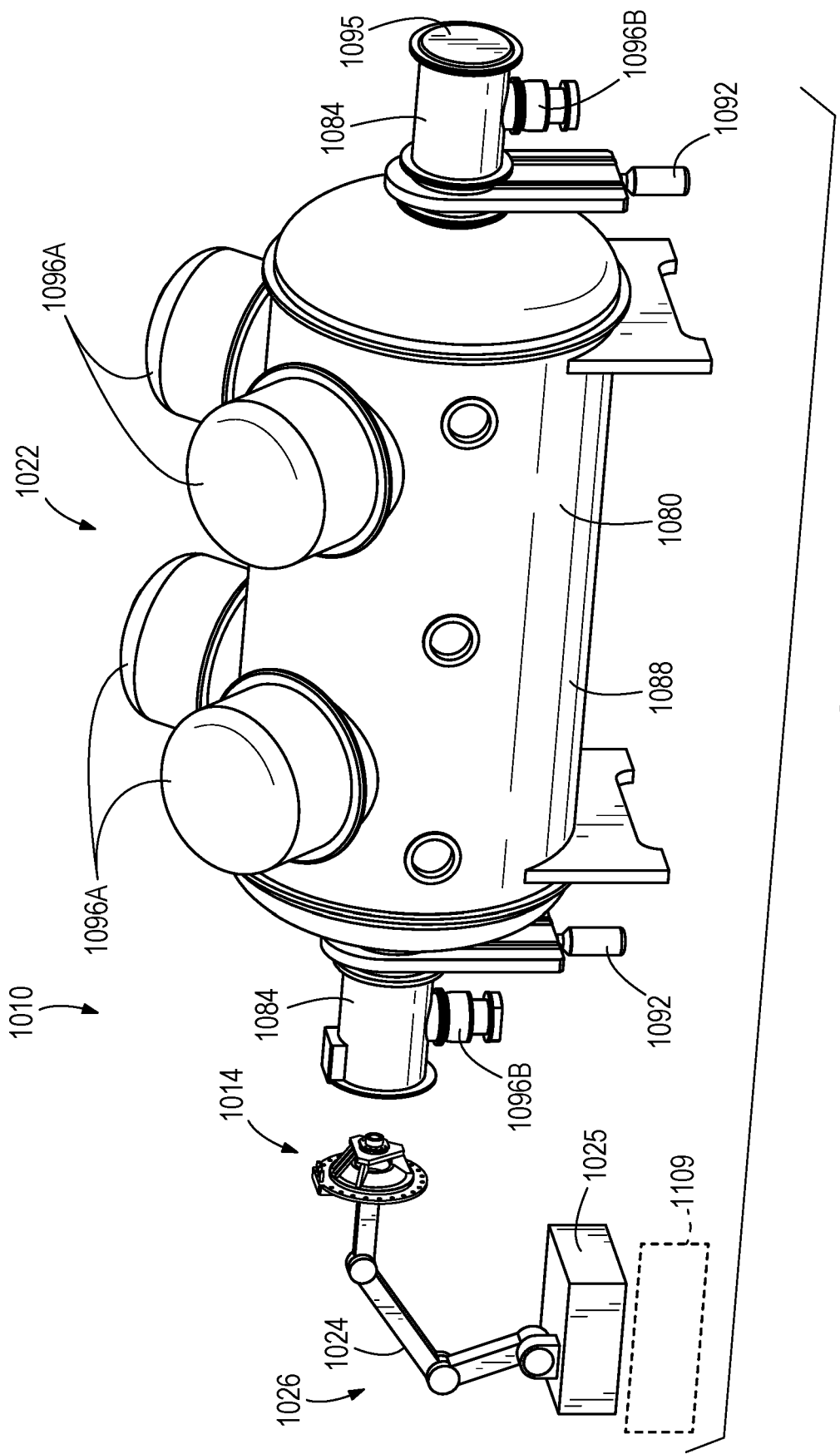
FIG. 1 is a perspective view of a testing facility including a testing assembly in accordance with the disclosure, illustrating an interface assembly of the testing assembly in a first, disengaged position.
Figure 2:
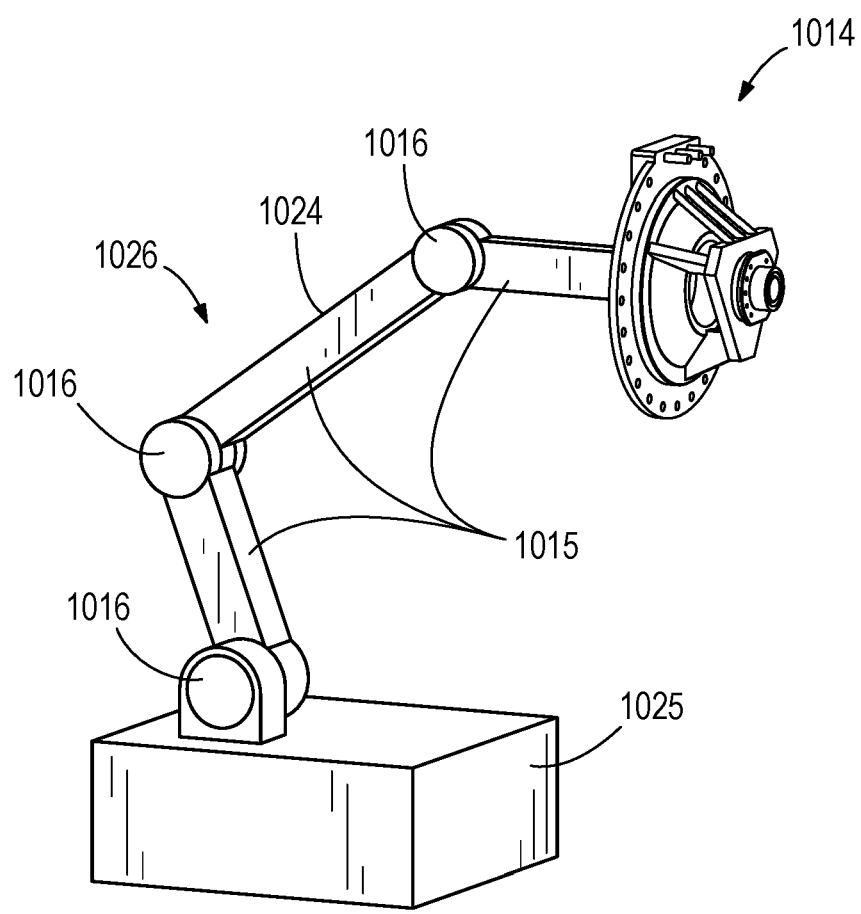
FIG. 2 is a perspective view of the testing assembly of FIG. 1 illustrating the interface assembly and a manipulation system.

FIG. 1 illustrates a testing assembly 1010 for testing a satellite-based OBP system. The testing assembly 1010 includes an interface assembly 1014 configured for connection with the OBP system and for connection with a portion of a testing facility 1022. The testing assembly 1010 also includes a manipulation system 1026. The illustrated manipulation system 1026 is a robotic arm 1024 supported by a base 1025. The robotic arm 1024 is configured for movement, i.e., rotating and translating, of the interface assembly 1014 relative to the testing facility 1022. As shown in FIG. 2, the illustrated robotic arm 1024 includes a plurality of segments 1015 connected by joints 1016 for moving the interface assembly 1014. In other embodiments, the manipulation system may instead take other forms, such as that of a mobile cart, e.g., on wheels or rails, to move the interface assembly 1014 relative to the testing facility 1022.

Figure 3:
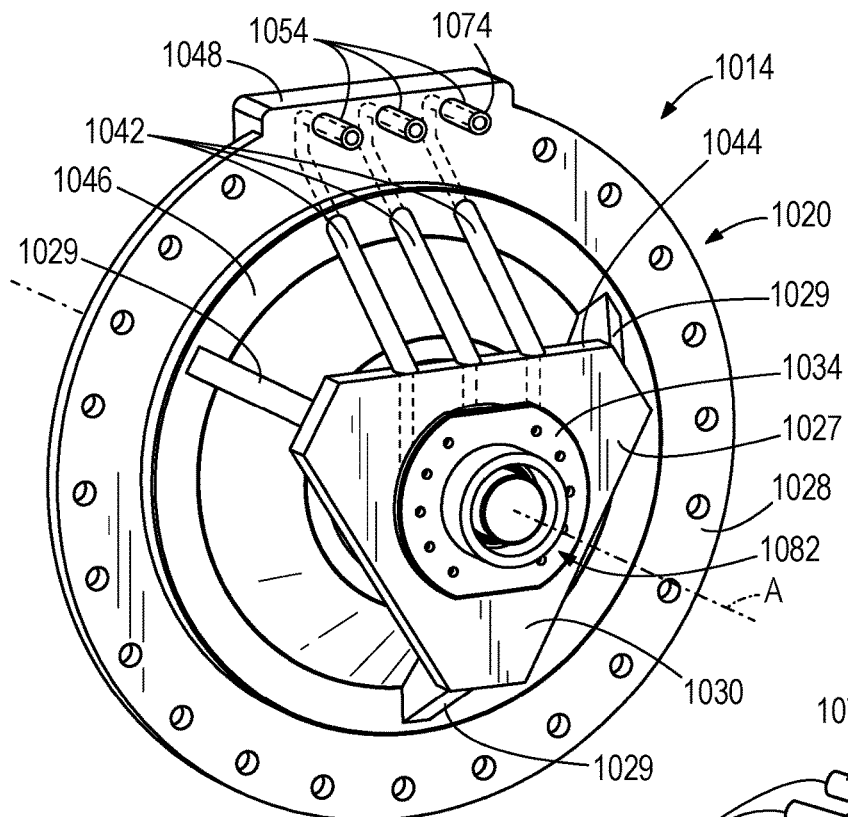
FIG. 3 is a front perspective view of the interface assembly of FIG. 2, including an interface member and an OBP system.
Figure 4:
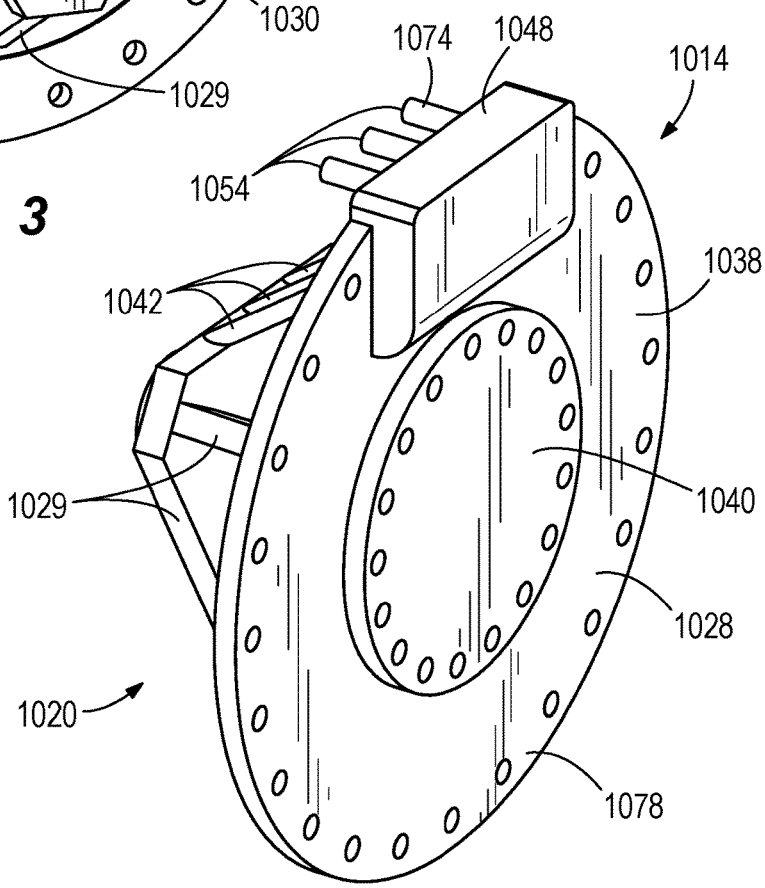
FIG. 4 is a rear perspective view of the interface assembly of FIG. 3.

FIGS. 3-4 illustrate the interface assembly 1014 including an interface member or body 1020. The body 1020 includes a mounting member 1027 (i.e., in the form of a plate or flange) and a support member 1028 (i.e., in the form of a plate or disc) spaced from and connected by legs 1029 to the mounting member 1027. In the illustrated embodiment, the interface assembly includes three spacers or legs 1029, in which each leg 1029 is positioned at and extends from a corner of the mounting member 1027. The mounting member 1027 is shaped to accommodate the legs 1029, which may be more or fewer than three in number in some embodiments. In some embodiments, the mounting member 1027 may be adjacent the support member 1028, either abutting or minimally spaced therefrom. Alternatively, in other embodiments, the body 1020 may include only one of the mounting member 1027 and the support member 1028. Further, in other embodiments, the body 1020 may be generally cuboid in shape and accordingly presents a plurality of sides or faces. Still further, in other embodiments the body 1020 may be one of many shapes that presents a plurality of surfaces, as will be further explained below.

A surface of the mounting member 1027 facing away from the support member 1028 is a first surface or side 1030 of the interface assembly 1014. A bracket 1034 is secured (by fasteners) to the first side 1030 (i.e., the mounting member 1027). The bracket 1034 is configured for coupling to an OBP system 1082 such that the OBP system 1082 extends from and is supported by the mounting member 1027. Alternatively, the mounting member 1027 may serve as the aforementioned bracket or otherwise be in the form of a bracket, brace, arm, truss, etc., and may closely couple the OBP system 1082 to the body 1020 or couple the OBP system 1082 at a spaced distance from the body 1020, as alternatively described herein. In other embodiments, the mounting member 1027 itself may form any one of the sides of the body 1020 and/or the bracket 1034 may be positioned on any one of the sides of the body 1020.

The support member 1028 is generally planar and has a generally circular shape. More specifically, the support member 1028 is cylindrically shaped and defines a longitudinal axis A therethrough. The mounting member 1027 is spaced from the support member 1028 along the longitudinal axis A. In addition, the support member 1028 is sized relatively larger than the mounting member 1027, as will be further explained. A surface of the support member 1028 facing away from the mounting member 1027 is a second side 1038 (FIG. 4) of the interface assembly 1014. A mount 1040 is secured to the second side 1038 (such as by fasteners). The illustrated mount 1040 is itself a plate having a generally circular shape and is sized relatively smaller than the support member 1028. In some embodiments, the mount 1040 is integrally formed as one piece with the support member 1028. The interface assembly 1014 is removably couplable to an end of the robotic arm 1024 (FIG. 5) via the mount 1040.

The illustrated first side 1030 and the second side 1038 are generally planar and provide attachment surfaces for the coupling of each of the OBP system 1082 and the end of the robotic arm 1024 to the interface assembly 1014. The second side 1038 is preferably opposite the first side 1030 such that the mount 1040 is on the other side of the body 1020 from the bracket 1034, but that need not be the case in all embodiments.

Referring again to FIG. 3, the interface assembly 1014 includes a plurality of channels 1042. The channels 1042 are supported by the body 1020. The illustrated channels extend between the mounting member 1027 and the support member 1028. Furthermore, in the illustrated embodiment, the interface assembly 1014 includes three channels 1042. In other embodiments, the interface assembly 1014 may include two or fewer or four or more channels 1042.

A portion of each of the channels 1042 is positioned at least partially internally within the mounting member 1027 and partially internally within the support member 1028. The channels 1042 are routed to transmit electrical signals, liquids, gases, or other materials from an entry point at a body surface to an exit point. The channels 42 may therefore be lined or unlined, and may themselves contain wire, hose, pipe, or other forms of conduit to promote the passage of the signals or materials. For example, the first and second channels 1042 may be routed to transmit electrical signal, and the third channel 1042 may be routed to transmit fluid such as propellant.

Specifically, in one embodiment, the channels 1042 are formed by conduit (e.g., pipe) extending between connectors or ports positioned on the first side 1030 (not shown; axially behind the bracket 1034 from the frame of reference of FIG. 3) of the mounting member 1027 and connectors or ports 1054 of the support member 1028. The illustrated channels 1042 extend from the ports on the first side 1030 as passageways through an edge 1044 of the mounting member 1027 to an intermediate side 1046 of the interface assembly 1014. The channels 1042 then extend as passageways through the support member 1028 from the intermediate side 1046 to at or near a top edge 1048 of the support member 1028. In particular, the channels 1042 enter and exit the support member 1028 at the intermediate side 1046. More specifically, the mounting member 1027 and the support member 1028 define passages or passageways and the channels 1042 are formed by conduit (e.g., flexible hose) portions that extend from the ports on the first side 1030 through the passages of the mounting member 1027 and the passages of the support member 1028 to the ports 1054 of the support member 1028. The passages may be formed during manufacture of the mounting member 1027 and the support member 1028 (e.g., by casting) and/or may be formed by boring out the passages in the mounting member 1027 and the support member 1028 after manufacture.

In other embodiments, the "channels" are instead wire, hose, pipe, or other conduit routed wholly or partially along an outside surface of the body 1020 and/or the outside surfaces of the support member 1028 and the mounting member 1027. In some embodiments, the body 1020 is one piece and the channels are alternatively formed by the passages such that the channels are completely embedded within the body 1020. In yet other embodiments, the channels are a mix of internal, partially embedded, or external wires, hoses, pipes, or other conduits extending from an entry point on or in the body 1020 to an exit point on or in the body 1020. In yet still other embodiments, the passages are lined with suitable material for forming the channels such that the channels are formed in part by the passages and the conduit extends from the passages to the ports. Furthermore, in some embodiments, all of the ports (i.e., the ports on the first side 1030 and the ports 1054) may be located on the same or different sides, or in any combination thereof, of the body 1020. In yet other embodiments, only a single channel is provided, or a single channel is configured to contain or permit passage of multiple fluids, or a combination of electrical signals, liquids, gases, or other materials in a manner as described herein.

Connectors 1074 (FIG. 3), e.g., "quick connect" or similar connectors for coupling provide coupling points configured to removably join the ports of the mounting member 1027 and the ports 1054 of the support member 1028 with external connections in the form of wire, hose, pipe, and other conduit, which will be further described below. The connectors 1074 may be integrally formed with the ports 1054 or connected to the ports of the first side 1030 and/or the ports 1054 such that the connectors 1074 extend from the respective ports 1054.

The ports of the mounting member 1027 are in communication with the OBP system 1082 (such as by similar connectors 1074 as described above) such that the channels 1042 are connected between the OBP system 1082 and the ports 1054. In one embodiment, the bracket 1034 includes mating connectors such that when the OBP system 1082 is secured by the bracket 1034 to the first side 1030, the bracket 1034 also fluidly connects the OBP system 1082 with the channels 1042 of the interface assembly 1014. In other words, the OBP system 1082 is fluidly connected with the channels 1042 through the bracket 1034. More specifically, the bracket 1034 includes ports and channels extending therebetween similar to the channels 1042 of the body 1020 which are routed to transmit electrical signals, liquids, gases, or other materials. For example, the bracket 1034 includes ports for fluidly connecting between the ports on the first side 1030 of the body 1020 and connection points of the OBP system 1082. The wire, hose, pipe, or other conduit extends between the ports and/or the bracket 1034 itself may define passages extending between the ports for forming the channels of the bracket 1034.

On the other, second side 1038 of the interface assembly 1014, the ports 1054 of the support member 1028 are fluidly connected to the testing facility 1022, as further discussed below. Therefore, the OBP system 1082 may be fluidly connected to the testing facility 1022 via the channels 1042.

Figure 5:
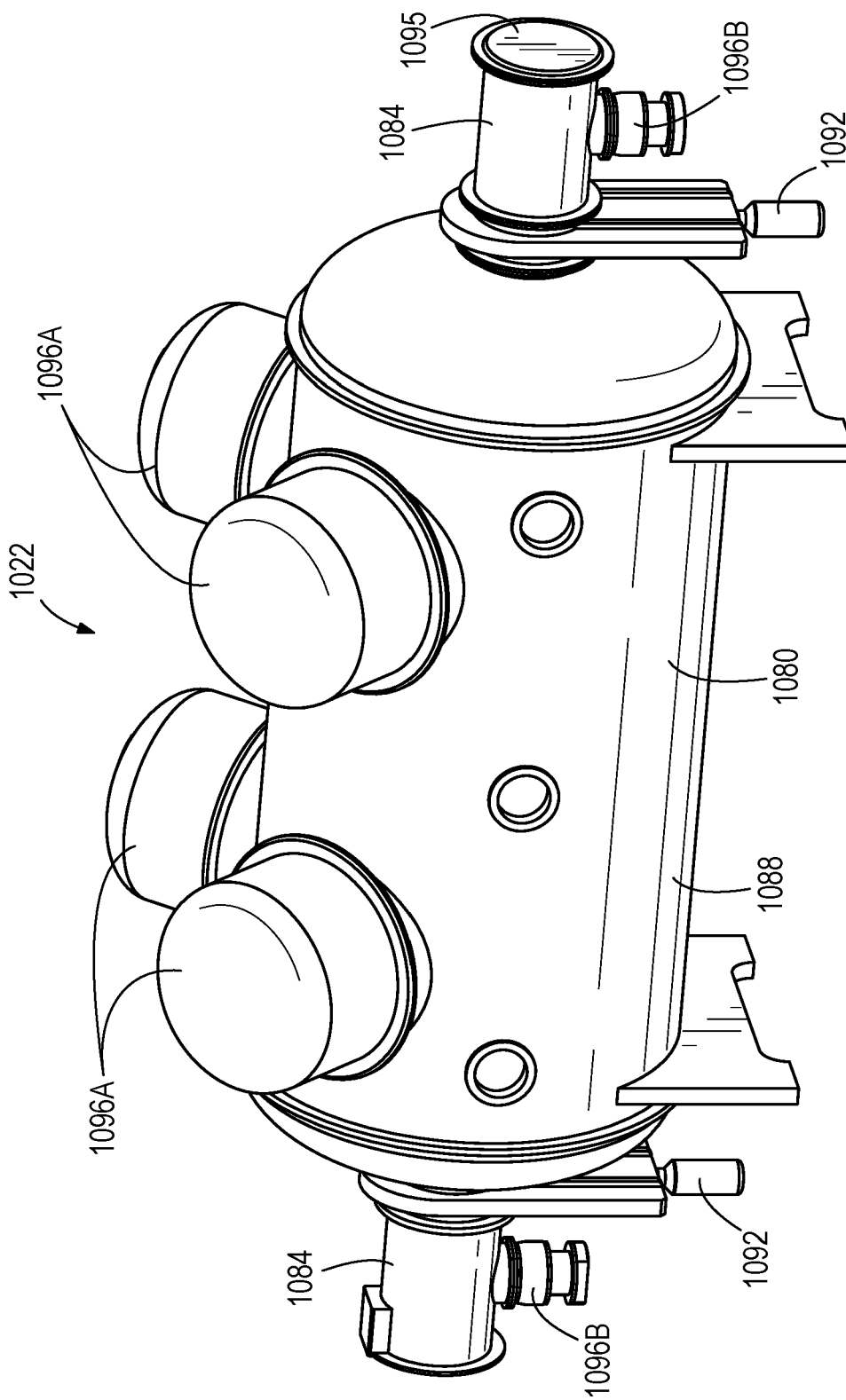
FIG. 5 is a perspective view of the testing facility of FIG. 1.

FIG. 5 illustrates one embodiment of the testing facility 1022 including a vessel or chamber 1080. The chamber 1080 includes a plurality of lateral chambers 1084 and a main test chamber 1088. In the illustrated embodiment, the chamber 1080 includes two lateral chambers 1084. In other embodiments, the chamber 1080 may include one or three or more chambers 1080 or sub chambers (i.e., test chamber 1088, lateral chambers 1084). The two illustrated lateral chambers 1084 are positioned at opposite ends of the test chamber 1088. Furthermore, the two lateral chambers 1084 may be termed as the OBP system engagement chambers.

Figure 8:
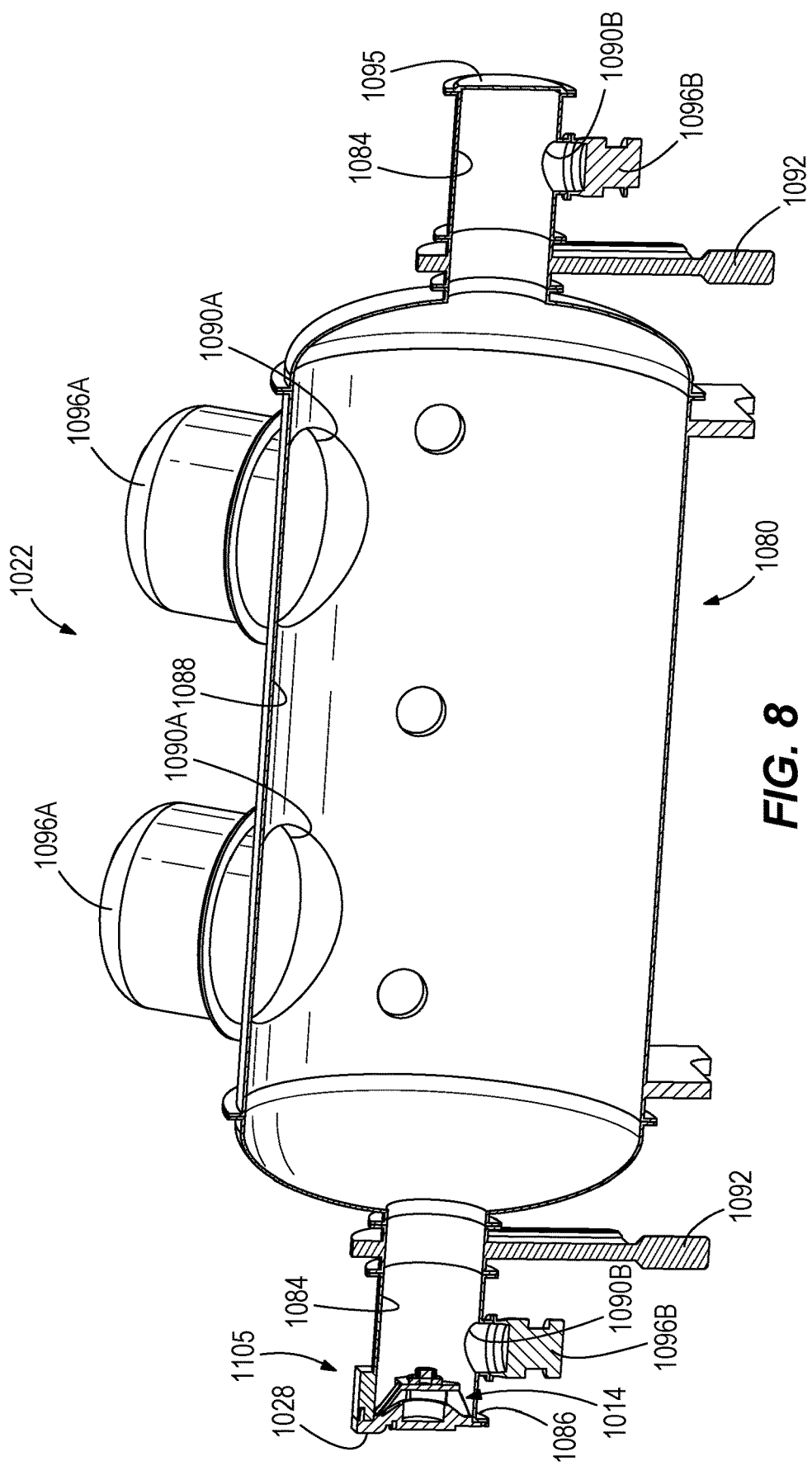
FIG. 8 is a cross-sectional view of the testing facility of FIG. 7.

With reference to FIG. 8, the testing facility 1022 further includes a plurality of connection points 1090 for connection to vacuum pumps 1096. As such, the vacuum pump 1096 may be in operative communication with the chamber 1080. In the illustrated embodiment, the test chamber 1088 includes four openings 1090, and each lateral chamber 1084 includes one opening 1090. In other embodiments, the testing facility 1022 may include one or more openings 1090 for connection to a vacuum pump 1096. The illustrated openings 1090A of the test chamber 1088 are configured for connection with a cryopump or cryogenic pump 1096A. Each opening 1090B of the lateral chamber 1084 is configured for connection with a turbomolecular pump 1096B, an example of which is a stand-in Pfeiffer vacuum turbopump sold by Pfeiffer Vacuum. Other pumps suitable therewith include ion pumps, cryopumps, or diffusion pumps. In other embodiments, the chamber 1080 may comprise one or three or more vacuum pumps 1096 for each chamber 1080 or sub chamber 1084, 1088, or with only one vacuum pump 1096 serving all chambers 1080 or sub chambers 1084, 1088.

With continued reference to FIG. 8, each of the lateral chambers 1084 is separated from the test chamber 1088 by a partition or divider 1092. In the illustrated embodiment, the divider is a valve 1092. The valve 1092 is movable from a first open position in which the associated lateral chamber 1084 and the test chamber 1088 are in fluid communication, to a second closed position in which the associated lateral chamber 1084 and the test chamber 1088 are not in fluid communication. In alternative embodiments, no valve or other partition exists between the lateral chamber(s) 1084 and the test chamber 1088.

Figure 6:
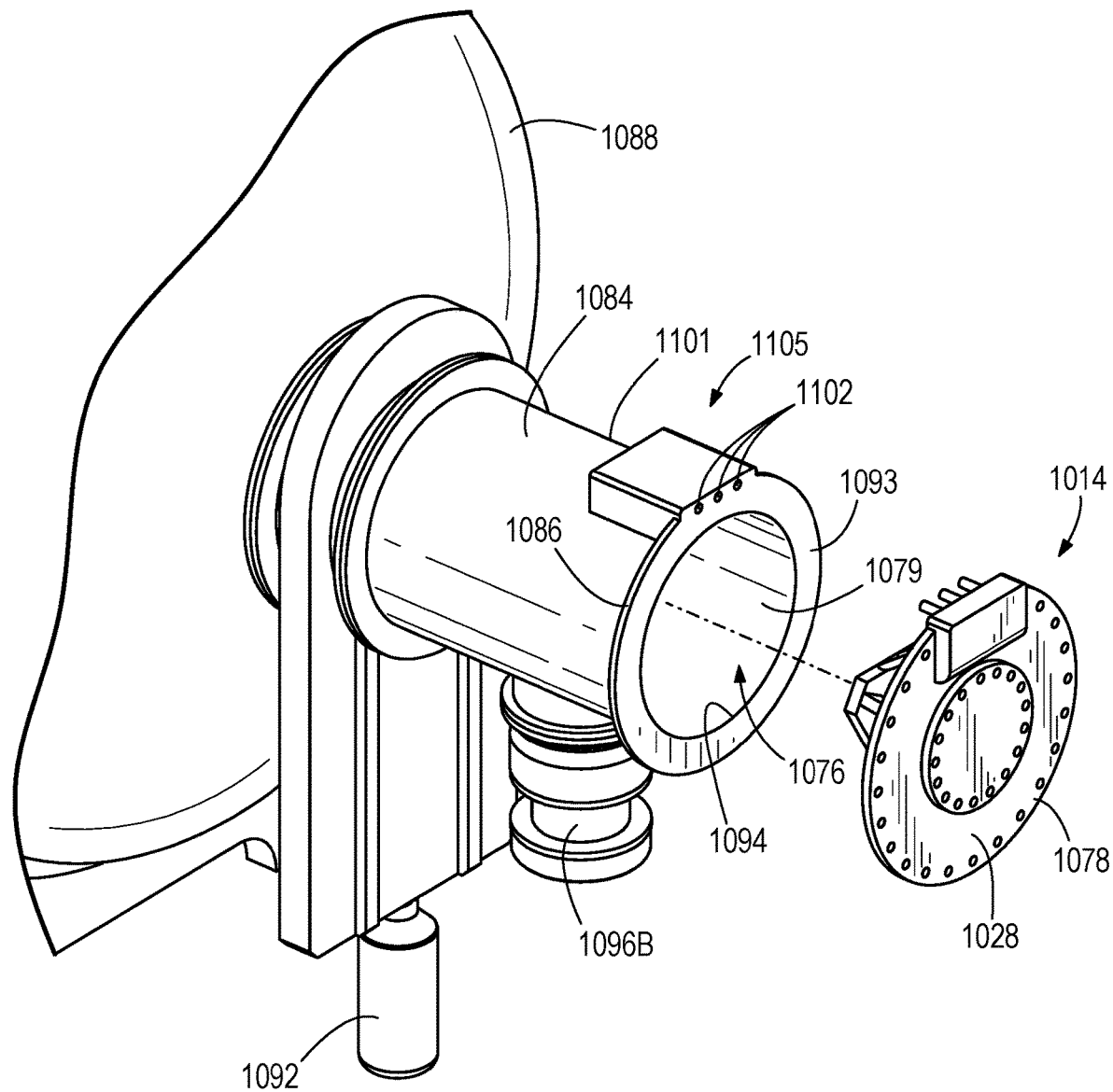
FIG. 6 is an enlarged, partially exploded view of an end portion of the testing facility of FIG. 5 including the interface assembly of FIG. 3.

With reference to FIGS. 5 and 6, an end 1086 of each lateral chamber 1084 includes a rim 1093 forming an opening 1094 fluidly connecting an internal volume 1076 of the lateral chamber with the external environment (i.e., of a laboratory or testing room). As shown in FIG. 5, one of the lateral chambers 1084 (i.e., the one to the right from the frame of reference of FIG. 5) includes a cover 1095 secured to the rim 1093 for enclosing the opening 1094, and the other of the lateral chambers 1084 (i.e., the one to the left from the frame of reference of FIG. 5) is open to the external environment. An outer circumferential portion 1078 (FIG. 6) of the support member 1028 of the interface assembly 1014 cooperates with the rim 1093. In other words, the support member 1028 is sized corresponding to a circumference of the rim 1093 such that the support member 1028 is engageable with the entire circumference of the rim 1093. Furthermore, an internal surface 1079 (e.g., "chamber wall") of the lateral chamber 1084 is generally cylindrical in view of conditions during testing, as will be further explained. The rim 1093 may also form a portion of and be termed as the chamber wall.

With reference to FIGS. 6 and 8, the lateral chamber 1084 includes a supply assembly 1105. The illustrated supply assembly 1105 is positioned at a top 1101 of the mount chamber 1084 adjacent the rim 1093, as illustrated, but in other embodiments could be positioned about the respective lateral chamber 1084 at other locations. The supply assembly 1105 is connected (by connectors not shown) to external supplies (e.g., a propellant supply, a power supply, water, etc.) for supplying the respective material through ports 1102 to the ports 1054 of the interface assembly 1014. In the illustrated embodiment, the ports 1054 form the male connection and the ports 1102 form the female connection. However, in other embodiments, the ports 1102 may include connectors 1074 extending from the ports 1102 for connecting to the ports 1054 of the interface assembly 1014.

Figure 9:
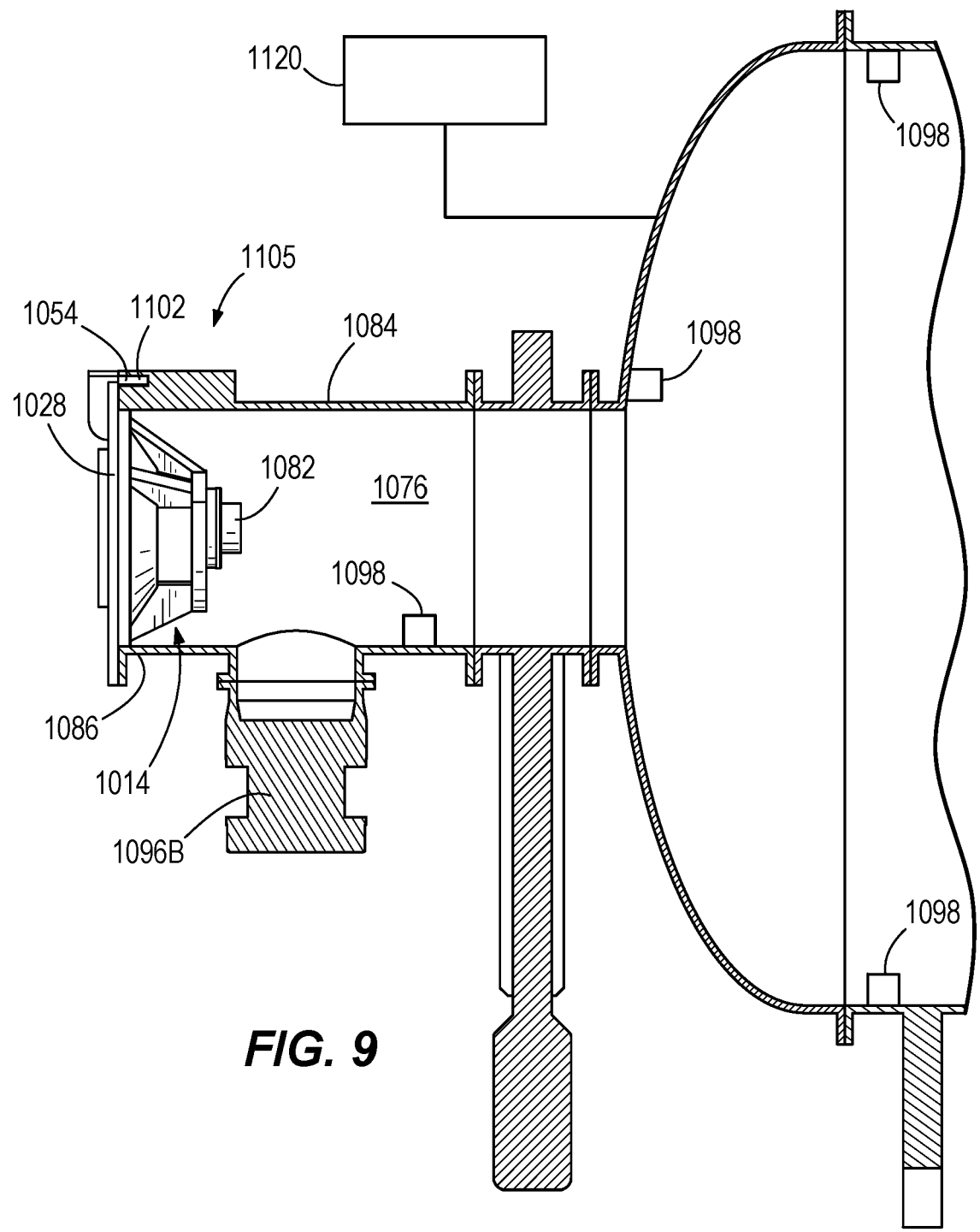
FIG. 9 is an enlarged side view of the end portion of the testing facility of FIG. 7 with portions removed for clarity.

The interface assembly 1014 and/or the testing facility 1022 may further contain diagnostic equipment such as diagnostic probes, sensors, strain gauges, and other testing components 1098. For example, as shown in FIG. 9, the testing facility 1022 includes a plurality of sensors 1098 positioned within the chamber 1080 (including the lateral chamber 1084). The sensors 1098 are configured to measure the temperature, emitted exhaust beam, and other testing and environmental parameters that occur during testing within the chamber 1080. In addition, the interface assembly 1014 may include a force measurement system, for instance a strain gauge load cell (not shown) positioned intermediate the OBP system 1082 and the first side 1030 (i.e., between the bracket 1034 and the OBP system 1082) or at another suitable location. The strain gauge load cell is configured to measure the output thrust force produced by the OBP system 1082 during testing.

The testing components 1098 (e.g., the sensors in the chamber 1080, the strain gauge load cell, and others) are in electrical communication with a controller 1120. The controller 1120 may form a part of a test control and data recording system for collecting data indicated by the sensors 1098. The controller 1120 may send the data to a main controller or control system or may itself be the main controller for controlling operation of the testing facility

1022. In particular, the controller 1120 is operable to control and/or initiate testing parameters such as fluid flow, electrical signals, etc., to the OBP system 1082 and to operate diagnostic equipment and the sensors 1098 as part of the testing procedure. The controller 1120 may be further in operable communication with the vacuum pumps 1096, the valve 1092, and the manipulation system 1026. In embodiments with a strain gauge load cell positioned locally to the interface assembly 1014, the load cell may be electrically connected to the controller 1120 via the channels 1042 routed to transmit electrical signals.

Figure 7:
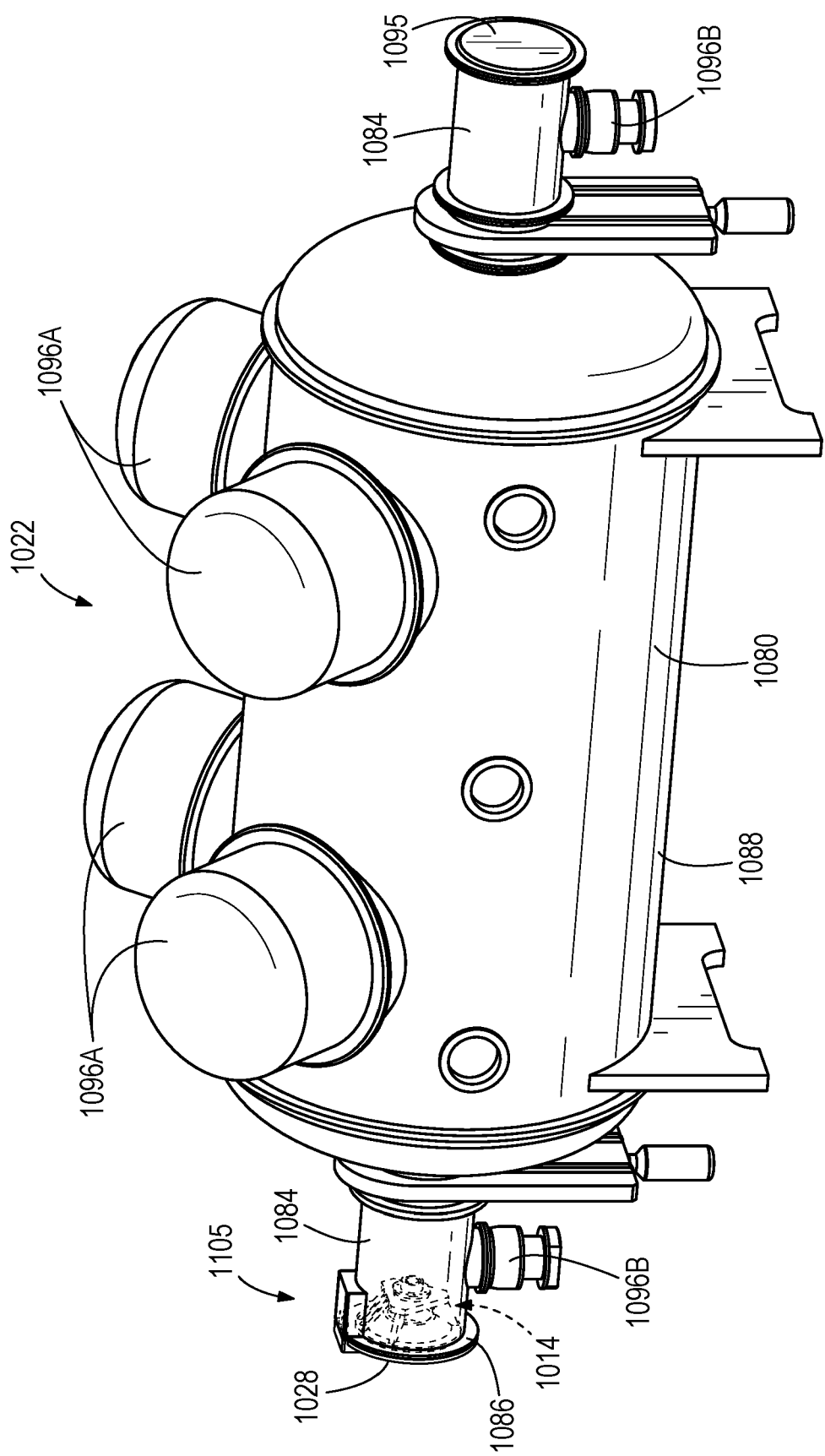
FIG. 7 is a perspective view of the testing facility of FIG. 5 and the interface assembly, illustrating the interface assembly in a second, engaged position.

With reference to FIGS. 1 and 6-9, the robotic arm 1024 of the manipulation system 1026 is configured to move the interface assembly 1014 between a first, disengaged position (FIGS. 1 and 6) and a second, engaged position (FIG. 7). When the interface assembly 1014 is in the disengaged position, the interface assembly 1014 is not fluidly connected or otherwise coupled to the respective lateral chamber 1084. Specifically, the manipulation system 1026 supports the interface assembly 1014 in the disengaged position (FIG. 1). When the interface assembly 1014 is in the engaged position, the interface assembly 1014 (i.e., the support member 1028) is secured to the rim 1093 and the channels 1042 are fluidly connected to the ports 1102 of the supply assembly 1100. As shown in FIG. 1, the manipulation system 1026 is positioned such that some or all of it may be external to the lateral chamber 84 (FIG. 1). More specifically, all or a portion of the manipulation system 1026 may be positionable within a transfer location 1109 or otherwise configured for access to both the transfer location 1109 and the lateral chamber 1084.

The interface assembly 1014 is partially insertable (by the manipulation system 1026) into a lateral chamber 1084 and removably couplable to the end 1086 of the lateral chamber 1084 (i.e., the OBP system engagement chamber) to seal the internal volume 1076. In the illustrated embodiment, the outer circumferential portion 1078 of the support member 1028 is coupled to the rim 1093, such as by fasteners (e.g., bolts), and the mounting member 1027 (having the OBP system 1082) extends from the support member 1028 by the legs 1029 within the lateral chamber 1084. In particular, the mounting member 1027 is sized smaller than the support member 1028 for fitting within the lateral chamber 1084. In addition, the support member 1028 of the interface assembly 1014 is configured as a cover for enclosing the opening 1094. The OBP system 1082 is positioned within the lateral chamber 1084 when the support member 1028 is secured to the lateral chamber 1084.

The coupling of the interface assembly 1014 to the rim 1093 may be automatic and/or manually performed. For example, in the illustrated embodiment, the robotic arm 1024 may position the support member 1028 adjacent the rim 1093 and an operator may manually drive fasteners around the outer circumferential portion 1078 of the support member 1028. In other embodiments, the coupling process may be completely automatic (e.g., another robot configured to secure the support member 1028 to the rim 1093, or automated locks or connectors (e.g., pneumatic, electric) to secure the support member 1028 to the rim 1093). The ports 1054 of the interface assembly 1014 are fluidly coupled with the ports 1102 of the supply assembly 1105 concurrently with or after the interface assembly 1014 is secured to the rim 1093 of the respective lateral chamber 1084.

As shown in FIGS. 8 and 9, the ports 1054 of the support member 1028 are fluidly connected when the interface assembly 1014 is mounted or otherwise secured to the lateral chamber 1084. In particular, in the illustrated embodiment as shown in FIG. 8, an end of each of the channels 1042 having the port 1054 is received in the respective port 1102 of the supply assembly 1100 when the support member 1028 is mounted flush with the rim 1093. In other embodiments, the ports 1054 may be connected with the ports 1102 of the supply assembly 1105 by clamps, pneumatic locks, or other types of connectors/fasteners that fluidly couple the ports 1054, 1102 together. Operational engagement of the interface assembly 1014 with the vessel 1080, to be further described, may therefore be fully automated.

Figure 10:
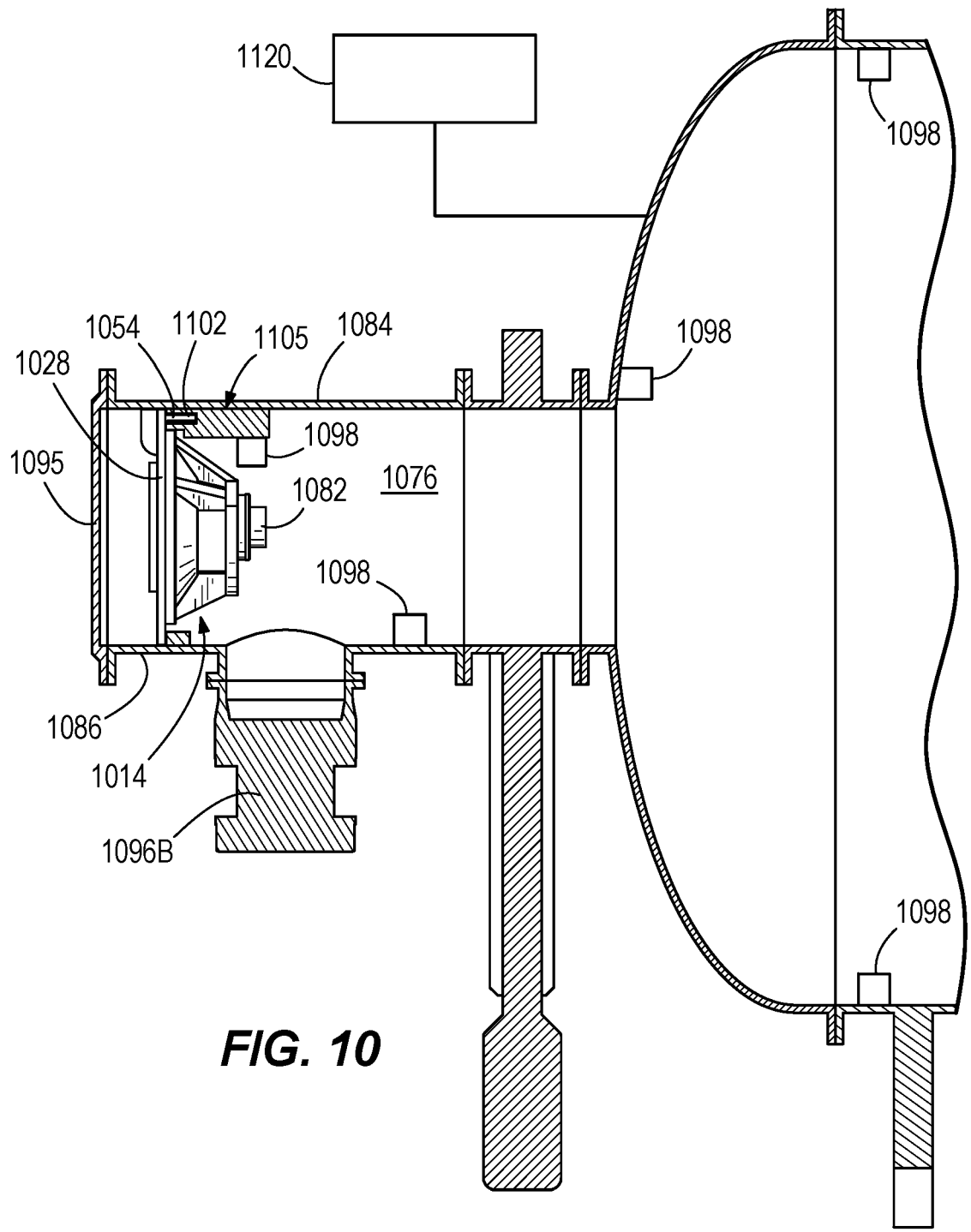
FIG. 10 is another enlarged side view of the end portion of the testing facility illustrating another embodiment of an interface assembly in an engaged position in accordance with the disclosure.

FIG. 10 illustrates an alternative embodiment of the OBP system engagement chamber 1084 in which the supply assembly 1105 is at least partially within the chamber 1084. In this embodiment, the outer circumferential portion 1078 of the support member 1028 is sized such that the support member 1028 fits wholly within the lateral chamber 1084. The ports 1102 of the supply assembly 1105 are also positioned on the portion of the supply assembly 1105 that is within the lateral chamber 1084 such that the fluid connection between the interface assembly 1014 and the supply assembly 1100 is within the lateral chamber 1084. A cover 1095 is secured to the opening 1094 after the interface assembly 1014 is mounted within the lateral chamber 1084 for sealing the chamber 1084. The cover 1095 may be hinge-mounted or securable in a manner again permitting operational engagement of the interface assembly 1014 with the vessel 1080, to be further described, to be fully automated.

The supply assembly 1105 of FIG. 10 may include a performance measurement stand (i.e., a stand including and/or electrically connected to the testing components 1098, such as the sensors, within the chamber 1080). In one example, the performance measurement stand may include an inverted pendulum stand having non-contact actuators such as electromagnets. Alternative to the strain gauge load cell positioned on the interface assembly 1014, the inverted pendulum stand determines the output thrust force produced by the OBP system 1082 during testing based on how much force the electromagnets generate to maintain the OBP system 1082/interface assembly 1014 in an upright position (relative to the lateral chamber 1084). In another embodiment, the performance measurement stand may be a torsional pendulum, which determines output thrust force produced by the OBP system during testing based on an angular displacement of a torsional spring. As such, the testing facility 1022 may include the sensors and other measurement components suitable to measure the thrust output, as well as the temperature, emitted exhaust beam, and other testing and environmental parameters that occur during testing within the chamber 1080.

Figure 11:
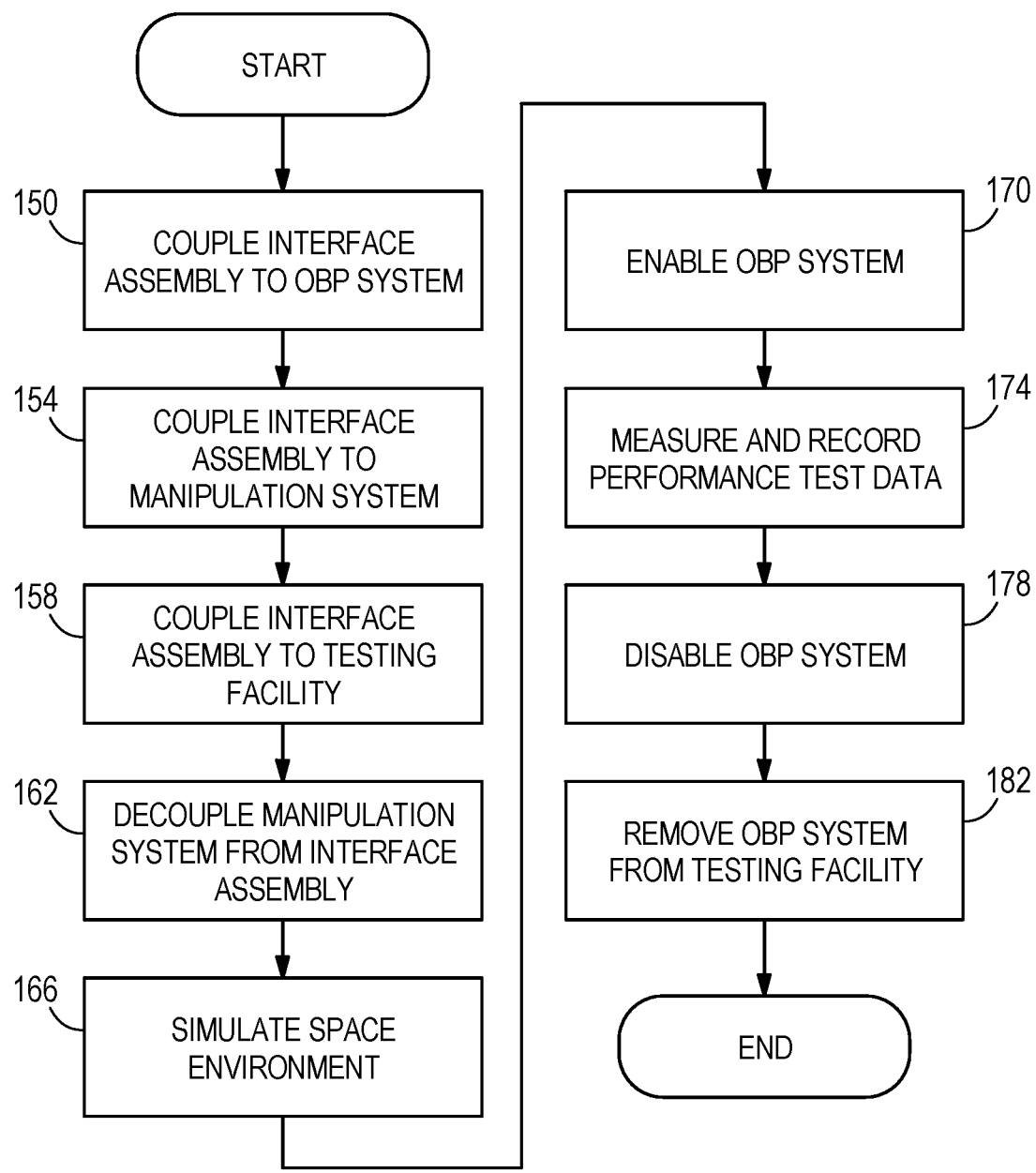
FIG. 11 is a flow diagram of a testing process associated with testing OBP systems.

With reference to FIG. 11, the steps of assembly and operation of testing of the OBP 1082 system is discussed below.

In a first step of assembly and operation, the OBP system 1082 is coupled to the interface assembly 1014 via the mounting member 1027/bracket 1034, step 150. This step may be manual or semi-automated and/or facilitated by additional equipment, and may include coupling the ports of the first side 1030 with mating ports of the bracket 1034 and OBP system 1082 using external connections such as the connectors 1074 or otherwise in the form of wire, hose, pipe, or other conduit configured to transmit electrical signals, liquids, gases, or other materials as necessary for testing. Step 150 occurs in the transfer location 1109 but may in some instances occur near or in the lateral chamber 1084. In other embodiments, the OBP system 1082 is coupled to the interface assembly 1014 in a separate procedure and then the OBP system 1082/interface assembly 1014 is positioned within the transfer location 1109.

In a second step 154, the interface assembly 1014 is coupled to the manipulation system 1026 via the mount 1040. The manipulation system 1026, which may be controlled by the controller 1120 or independently controlled, and in particular the robotic arm portion 1024 thereof, is brought into proximity with the mounting member 1040 and coupled thereto without manual assistance. In some embodiments, the interface assembly 1014 may first be coupled to the manipulation system 1026 and thereafter the OBP system 1082 is coupled to the mounting member 1027/bracket 1034.

In a third step 158, the interface assembly 1014 is connected to or engaged with the testing facility 1022. With respect to the testing facility 1022 of FIGS. 5-7, the interface assembly 1014 is coupled to the end 1086 of the lateral chamber 1084 and is operationally connected to the testing facility 1022 via the supply assembly 1105. In particular, step 158 may include moving the interface assembly 1014/OBP system 1082 from the transfer location 1109 toward the lateral chamber 1084. Step 158 may further include positioning the support member 1028 adjacent the rim 1093 of the lateral chamber 1084 such that the mounting member 1027 and the OBP system 1082 is positioned within the lateral chamber 1084. Step 158 may further include securing the support member 1028 of the interface assembly 1014 to the rim 1093.

With respect to the testing facility 1022 of FIG. 10 and the third step 158, the interface assembly 1014 is positioned within the lateral chamber 1084 and is connected to the testing facility 1022 via the supply assembly 1105 within the chamber 1084. In particular, if mounting of the interface assembly 1014 to the manipulation system 1026 occurs in the transfer location 1109, step 158 includes moving the interface assembly 1014/OBP system 1082 from the transfer location 1109 into the lateral chamber 1084. Step 158 further includes positioning the interface assembly 1014 onto the supply assembly 1105. The manipulation system 1026 may only need to position the interface assembly 1014 proximate the supply assembly 1105, with the weight of the interface assembly 1014/OBP system 1082 wholly or partially supported by the manipulation system 1026.

The ports 1054 (or its connectors 1074) are coupled to the ports 1102 the supply assembly 1105. In some embodiments, positioning of the interface assembly 1014 adjacent the supply assembly 1105 results in concurrent and automatic coupling of the connectors 1074 of the ports 1054 with the supply ports 1102 (or its connectors). In one example, the channels 1042 are received in the ports 1102 when the interface assembly 1014 is moved into the engaged position for the automatic connection to the supply assembly 1105. In other embodiments, the flexible wires/hose/conduit, etc. extend from the supply ports 1102 to the above-mentioned connectors 1074, and may require manual assistance for coupling thereto. Once so connected in either manner, the OBP system 1082 is in electrical/gas/liquid/fluid communication with the testing facility 1022 through the interface assembly 1014 (via the connectors 1074 and the ports 1102, 1054). Specifically, electrical signals (power and data), liquids, gases, or other materials can be transferred from the testing facility 1022 to the OBP system 1082.

In a fourth step 162, if the interface assembly 1014/OBP system 1082 is secured to the rim 1093 or within the chamber 1084, the manipulation system 1026 is subsequently decoupled from the interface assembly 1014 (the mount 1040) and may further be moved (away) from the lateral chamber 1084.

In a step 166, the controller 1120 activates the vacuum pumps 96, 1096A, 1096B to evacuate air in the lateral and test chambers 1084, 1088 to simulate a space environment. The controller 1120 may be further configured to manipulate the valve 1092 from a closed position to an open position for introducing the OBP system 1082 to the test chamber 1088. Specifically, the OBP system 1082 is no longer isolated from the test chamber 1088 once the valve 1092 is opened. Furthermore, the valve 1092 may only be opened once the controller 1120 has determined that the OBP system 1082 is properly connected to the supply assembly 1100/performance measurement stand and the chamber 1080 has been evacuated to appropriately simulate a space environment. At this point, the OBP system 1082 is ready for testing.

In a sixth step 170, the controller 1120 enables operation of the OBP system 1082. As part of this, the controller 1120 is configured to activate the supply assembly 1105 to provide the desired electrical signal(s), fluid (e.g., propellant), gas or other materials from the supply assembly 1105 to the OBP system 1082 through the interface assembly 1014.

In a seventh step 174, the strain gauge load cell or the inverted pendulum stand or the torsional pendulum stand measures a resultant output thrust force of the OBP system 1082. This step 174 may further include measuring, using the diagnostic probes or sensors 1098 (some of which may be located on the stand), and other performance test data such as temperature, pressure, etc., within the lateral and test chambers 84, 88. The controller 1120 having the test control and data recording system monitors and records the performance data including the resultant output thrust force and associated parameters (e.g., propellant/fluid flow or consumption rate). This step may further include creating a report and/or analytic graphs of the performance test data. Specifically, the test control and data recording system is configured to produce a deliverable of test data to prove the OBP system's performance.

In an eighth step 178, the controller disables the OBP system 1082. Specifically, the controller deactivates passage of electrical signals and fluids through the supply assembly 1105 and to the interface assembly 1014.

In a ninth step 182, the OBP system 1082 is removed from the chamber 1080 after testing is completed. This step 182 may include deactivating the vacuum pumps 1096 by the controller 1120 to return the pressure within the chamber 1080 to atmospheric. Subsequently, the controller 1120 may control the manipulation system 1026 to move the robotic arm adjacent the support member 1028 (i.e., external to or within the lateral chamber 1084). This step 182 may further include re-coupling the robotic arm 1024 to the mounting member 1040 automatically or with manual assistance. The controller 1120 is then operable to control the manipulation system 1026 to move the robotic arm 1204 to return the interface assembly 1014/OBP system 1082 to the transfer location 1109, after which the OBP system 1082 is detached from the interface assembly 1014.

In other embodiments, some steps or portions of steps may be completed in a different order than stated above or may not be completed at all.

As such, the testing of the OBP system 1082 is substantially, if not wholly, automated. Specifically, the controller 1120 or other control system is operable to control selective connection and movement of the manipulation system 1026, establish a testing environment within the chamber 1080 using the vacuum pumps 1096 and the valve 1092, transfer signals and testing materials such as electrical power and data and liquids, gases, etc. to the OBP system 1082 from the testing facility 1022, and measure and record test data. As such, all testing of the OBP system 1082, from coupling to decoupling of the interface assembly 1014, may be completed in fewer than 8 hours. In other embodiments, the testing may be completed in fewer than 6 hours.

The present disclosure provides an automated OBP performance testing apparatus that significantly shortens the time required to conduct a performance test, reduces or eliminates the need for human interaction and assistance in performing the test, reduces the amount of human labor required to collect and report test results, reduces the test-to-test variability that is associated with human manual labor, and provides a unique interface assembly that can accommodate a variety of OBP variants without facility modification. The disclosure is amenable to complete robotic and unassisted operation, although operators may perform one or several assembly or testing functions. The system of the disclosure permits significant reduction in the amount of time and labor required to conduct testing on an OBP system.

Various features of the disclosure are set forth in the following claims.

What is claimed is:

1. An interface assembly comprising:
   a support member configured for direct coupling to and movement via a manipulation system;
   a mounting member configured for direct coupling to an on-board propulsion system, wherein the interface assembly is configured to connect the on-board propulsion system to a testing facility; and
   a plurality of channels, each channel of which extends from the mounting member to the support member, wherein at least one channel of the plurality of channels is configured to transmit fluid from the mounting member to the support member.

2. The interface assembly of claim 1, wherein the plurality of channels extends at least partially within the mounting member.

3. The interface assembly of claim 1, wherein the plurality of channels extends at least partially within the support member.

4. The interface assembly of claim 3, wherein the plurality of channels extends at least partially within the mounting member.

5. The interface assembly of claim 1, wherein the support member defines a longitudinal axis therethrough, and wherein the mounting member is spaced from the support member in the axial direction.

6. The interface assembly of claim 1, further including a plurality of legs extending between and coupling the mounting member to the support member.

7. A method for testing an on-board propulsion system within a testing facility, the method comprising:
   coupling the on-board propulsion system to a mounting member of an interface assembly, the interface assembly further including a support member connected to the mounting member, wherein at least one channel extends from the mounting member to the support member;
   coupling the interface assembly to a manipulation system;
   moving, via the manipulation system, the interface assembly coupled to the on-board propulsion system and to the manipulation system toward a chamber of the testing facility such that at least the mounting member is within the chamber;
   connecting the moved interface assembly to the testing facility such that the interface assembly is configured to receive a fluid from the testing facility; and
   operating the on-board propulsion system.

8. The method of claim 7, wherein moving, via the manipulation system, the interface assembly toward a chamber of the testing facility such that at least the mounting member is within the chamber includes moving, via the manipulation system, the interface assembly entirely within the chamber of the testing facility.

9. The method of claim 7, wherein moving, via the manipulation system, the interface assembly toward a chamber of the testing facility such that at least the mounting member is within the chamber includes moving, via the manipulation system, the interface assembly toward a chamber of the testing facility to engage a wall of the chamber.

10. The method of claim 7, further including removing the atmosphere within the chamber to simulate an outer space environment.

11. The method of claim 7, further including moving, via the manipulation system, the interface assembly away from the chamber of the testing facility such that the interface assembly is entirely outside of the chamber.

12. The method of claim 7, wherein the steps herein are accomplished in fewer than 8 hours.

13. The method of claim 7, further including de-coupling the interface assembly from the manipulation system.

* * * * *